United States Patent
Do et al.

(10) Patent No.: US 7,125,616 B2
(45) Date of Patent: Oct. 24, 2006

(54) MAGNETIC RECORDING DISK WITH ANTIFERROMAGNETICALLY-COUPLED MAGNETIC LAYER HAVING MULTIPLE LOWER LAYERS

(75) Inventors: Hoa Van Do, Fremont, CA (US); Eric Edward Fullerton, Morgan Hill, CA (US); David Margulies, Los Gatos, CA (US); Andreas Moser, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 306 days.

(21) Appl. No.: 10/788,687

(22) Filed: Feb. 26, 2004

(65) Prior Publication Data
US 2005/0190498 A1 Sep. 1, 2005

(51) Int. Cl.
*G11B 5/66* (2006.01)
(52) U.S. Cl. .................................. 428/828.1
(58) Field of Classification Search ...................... None
See application file for complete search history.

(56) References Cited

U.S. PATENT DOCUMENTS

| 6,280,813 B1 | 8/2001 | Carey et al. | |
| 6,773,834 B1 | 8/2004 | Van Do et al. | |
| 6,794,057 B1 * | 9/2004 | Wang et al. | 428/828.1 |
| 2003/0087135 A1 | 5/2003 | Wang et al. | |
| 2003/0124390 A1 * | 7/2003 | Abarra et al. | 428/695 |
| 2003/0170499 A1 * | 9/2003 | Okamoto | 428/694 MM |
| 2005/0008902 A1 * | 1/2005 | Bertero et al. | 428/694 TM |

FOREIGN PATENT DOCUMENTS

| EP | 1059629 A2 | 12/2000 |
| EP | 1343147 A3 | 4/2005 |
| WO | WO03/065356 A1 | 8/2003 |
| WO | WO-03-065356 A1 * | 8/2003 |

* cited by examiner

*Primary Examiner*—Kevin M. Bernatz
(74) *Attorney, Agent, or Firm*—Thomas R. Berthold

(57) ABSTRACT

A magnetic recording disk has an antiferromagnetically-coupled (AFC) structure that has three lower ferromagnetic layers (LL1, LL2, LL3) and an upper ferromagnetic layer (UL), all four ferromagnetic layers being antiferromagnetically-coupled together across corresponding antiferromagnetically-coupling layers. The UL has a magnetization-remanence-thickness product (Mrt) greater than the Mrt each of the three lower layers LL1, LL2, LL3, and greater than the sum of the Mrt values of LL1 and LL3. The middle lower layer LL2 has an Mrt less than the Mrt of each of the other lower layers LL1 and LL3, and as a result the composite Mrt of the AFC structure is less than the composite Mrt of a conventional AFC structure having only a single lower layer. The AFC structure achieves this composite Mrt reduction without increasing the Mrt of any of the three lower layers above the maximum Mrt of the single lower layer in the conventional AFC structure.

7 Claims, 4 Drawing Sheets

MAGNETIC RECORDING DISK WITH ANTIFERROMAGNETICALLY-COUPLED MAGNETIC LAYER HAVING MULTIPLE LOWER LAYERS

TECHNICAL FIELD

This invention relates generally to magnetic recording disks used in magnetic recording hard disk drives, and more particularly to a magnetic recording disk that has an antiferromagnetically-coupled (AFC) magnetic layer.

BACKGROUND OF THE INVENTION

As the storage density of magnetic recording hard disks has increased, there has been a corresponding reduction in the magnetization-remanence-thickness product (Mrt), and a corresponding increase in the coercivity ($H_c$), of the magnetic recording layer. Mrt is the product of the recording layer thickness t and the remanent (zero applied magnetic field) magnetization Mr (where Mr is measured in units of magnetic moment per unit volume of ferromagnetic material) of the recording layer. HC is related to the short-time switching field or intrinsic coercivity ($H_0$) required by the disk drive write head to write data on the recording layer. The trends in Mrt and $H_c$ have led to a decrease in the ratio Mrt/$H_c$.

To achieve the reduction in Mrt, the thickness t of the magnetic layer can be reduced, but only to a limit because the stored magnetic information in the layer will be more likely to decay. This decay of the magnetization has been attributed to thermal activation of small magnetic grains (the superparamagnetic effect). The thermal stability of a magnetic grain is to a large extent determined by $K_uV$, where $K_u$ is the magnetic anisotropy constant of the layer and V is the volume of the magnetic grain. As the layer thickness is decreased, V decreases. If the layer thickness is too thin, $K_uV$ becomes too small and the stored magnetic information will no longer be stable at normal disk drive operating conditions.

One approach to the solution of this problem is to move to a higher anisotropy material (higher $K_u$). However, the increase in $K_u$ is limited by the point where the coercivity $H_c$, which is approximately equal to $K_u/M_s$ ($M_s$=saturation magnetization), becomes too great to be written by a conventional recording head. A similar approach is to reduce the $M_s$ of the magnetic layer for a fixed layer thickness, which will reduce Mr since Mr is related to $M_s$, but this is also limited by the coercivity that can be written.

U.S. Pat. No. 6,280,813, assigned to the same assignee as this application, describes a magnetic recording medium wherein the magnetic recording layer is at least two ferromagnetic layers antiferromagnetically-coupled together across a nonferromagnetic spacer layer. In this type of magnetic media, referred to as AFC media, the magnetic moments of the two antiferromagnetically-coupled layers are oriented antiparallel in remanence, with the result that the net or composite Mrt of the recording layer is the difference between the Mrt of the upper and lower ferromagnetic layers. The upper ferromagnetic layer typically has a higher Mrt than the lower ferromagnetic layer so that the composite Mrt is given by $Mrt_{UL}-Mrt_{LL}$. This reduction in Mrt is accomplished without a reduction in volume V. Therefore the thermal stability of the recording medium is not reduced.

AFC media thus significantly improve the performance of magnetic recording disks. A low composite-Mrt means a low value of PW50, which is the half-amplitude pulse-width of an isolated read-back pulse of the recorded signal measured at low recording density. The PW50 value determines the achievable linear density, and a low value of PW50 is desirable. Therefore, the extendibility of AFC media is mainly determined by how much the structure can be used to reduce PW50, and this is determined by how large a value Mrt can be achieved in the lower ferromagnetic layer, since $Mrt_{COMPOSITE}=(Mrt_{UL}-Mrt_{LL})$.

However, with current AFC media there is a maximum Mrt value that can be used in the lower ferromagnetic layer above which the media's intrinsic signal-to-noise ratio ($S_0NR$) will become worse even though PW50 is still lowered and the composite Mrt is still dropping. For example, an AFC structure can be fabricated with a thicker lower ferromagnetic layer (increasing the lower layer Mrt by 0.05 memu/cm² above the maximum value) to achieve a PW50 value reduced by 3.5% from the reference AFC structure using the maximum lower layer Mrt. However, this results in an unacceptable decrease in $S_0NR$ of approximately 3.5 db.

There are two likely reasons why this decrease in $S_0NR$ occurs with AFC media when the lower layer becomes too thick. First, as the lower ferromagnetic layer is made thicker, its anisotropy-volume product ($K_UV$) increases. The $K_UV$ determines how susceptible the layer is to thermal fluctuations with the higher the $K_UV$ the less susceptible is the layer. It is well established that it is thermally-activated reversal that allows the small interlayer exchange field in AFC media to reverse the magnetization of the lower layer and thereby produce the desired antiparallel remanent configuration. Therefore, the higher the $K_UV$ of the lower layer (the higher the lower layer Mrt), the more difficult it is for the relatively small exchange field to completely reverse the magnetization of the lower layer. Second, the magnitude of the exchange field is inversely proportional to the lower layer Mrt, also making it more difficult for the antiferromagnetic interaction to reverse the magnetization of the lower layer as it becomes thicker. Therefore, as the lower layer Mrt is increased there are two effects that occur that make it more difficult to reverse the lower layer magnetization to form the antiparallel remanent configuration. These factors could cause some lower layer grains to not be antiparallel with their respective upper layer grains, possibly producing extra noise in the recorded signal causing the drop in $S_0NR$ that is measured. Increasing the exchange field by adding a high moment layer adjacent to the Ru layer is a potential way of postponing this problem, but the addition of this high moment layer reduces the $S_0NR$ such that in practice it is very difficult to significantly alter the exchange field without reducing $S_0NR$. Therefore, the problem of not being able to increase the thickness of the lower ferromagnetic layer in AFC media above some maximum value is a universal problem with these structures.

What is needed is a magnetic recording disk with an AFC structure that can take advantage of the reduction in composite Mrt and PW50, but without causing a reduction in $S_0NR$.

SUMMARY OF THE INVENTION

The invention is a magnetic recording disk with an AFC structure that has three lower ferromagnetic layers (LL1, LL2, LL3) and an upper ferromagnetic layer (UL), all four ferromagnetic layers being antiferromagnetically-coupled together across corresponding antiferromagnetically-coupling layers. The UL has an Mrt greater than the Mrt of each of the three lower layers LL1, LL2, LL3, and greater than the sum of the Mrt values of LL1 and LL3. The middle lower layer LL2 has an Mrt less than the Mrt of each of the other lower layers LL1 and LL3, and as a result the composite Mrt of the AFC structure is less than the composite Mrt of the conventional AFC structure. The AFC structure of this invention is able to achieve this composite Mrt reduction without increasing the Mrt of any of the three lower layers above the maximum Mrt of the single lower layer in the conventional AFC structure, and therefore avoids the $S_0NR$ degradation caused by too large of an Mrt in the lower layers.

For a fuller understanding of the nature and advantages of the present invention, reference should be made to the following detailed description taken together with the accompanying figures.

DETAILED DESCRIPTION OF THE INVENTION

Prior Art

Figure 1:
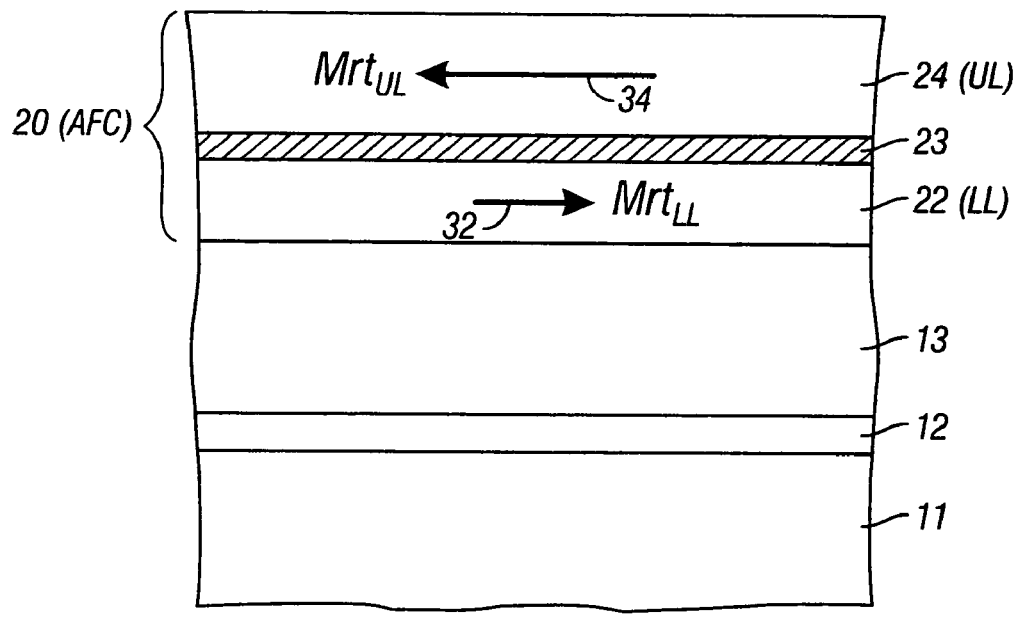
FIG. 1 is a schematic sectional view of an AFC magnetic recording disk according to the prior art.

FIG. 1 illustrates the cross sectional structure of a disk with an antiferromagnetically-coupled (AFC) magnetic layer 20 according to the prior art. The disk substrate 11 is any suitable material, such as glass, SiC/Si, ceramic, quartz, or an AlMg alloy base with a NiP surface coating. The seed layer 12 is an optional layer that may be used to improve the growth of the underlayer 13. The seed layer 12 is most commonly used when the substrate 11 is nonmetallic, such as glass. The seed layer 12 has a thickness in the range of approximately 1 to 50 nm and is one of the materials, such as Ta, CrTi, NiAl or RuAl, which are useful as seed materials for promoting the growth of subsequently deposited layers in certain preferred crystalline orientations. A pre-seed layer (not shown) may also be used between the glass substrate 11 and the seed layer 12. The underlayer 13 is deposited onto the seed layer, if present, or otherwise directly onto the substrate 11, and is a nonmagnetic material such as chromium or a chromium alloy, such as CrV, CrTi or CrMo. The underlayer 13 has a thickness in the range of 5 to 100 nm with a typical value being approximately 10 nm. A protective overcoat (not shown), such as amorphous carbon, is formed as the top layer over the AFC layer 20.

The AFC magnetic layer 20 is made up of a lower ferromagnetic layer (LL) 22 and an upper ferromagnetic layer (UL) 24, separated by a nonferromagnetic spacer layer 23 that acts as an antiferromagnetically-coupling layer. The nonferromagnetic spacer layer 23 thickness and composition are chosen so that the magnetic moments 32, 34 of adjacent layers 22, 24, respectively, are AF-coupled through the nonferromagnetic spacer layer 23 and are antiparallel in zero applied field, i.e., the remanent magnetic state. The two AF-coupled layers 22, 24 of layer 20 have magnetic moments that are oriented antiparallel, with the upper layer 24 having a larger moment. Thus $Mrt_{UL}$ is greater than $Mrt_{LL}$, and the composite Mrt for the AFC layer 20 is ($Mrt_{UL}$−$Mrt_{LL}$).

The AF coupling of ferromagnetic layers via a nonferromagnetic transition metal spacer layer, like the AFC structure of layer 20 in FIG. 1, has been extensively studied and described in the literature. In general, the exchange coupling oscillates from ferromagnetic to antiferromagnetic with increasing spacer layer thickness. This oscillatory coupling relationship for selected material combinations is described by Parkin et al. in "Oscillations in Exchange Coupling and Magnetoresistance in Metallic Superlattice Structures: Co/Ru, Co/Cr and Fe/Cr", Phys. Rev. Lett., Vol. 64, p. 2034 (1990). The material combinations include ferromagnetic layers made of Co, Fe, Ni, and their alloys, such as Ni—Fe, Ni—Co, and Fe—Co, and nonferromagnetic spacer layers such as Ru, chromium (Cr), rhodium (Rh), iridium (Ir), copper (Cu), and their alloys. For each such material combination, the oscillatory exchange coupling relationship has to be determined, if not already known, so that the thickness of the nonferromagnetic spacer layer is selected to assure antiferromagnetic coupling between the two ferromagnetic layers. The period of oscillation depends on the nonferromagnetic spacer material, but the strength and phase of the oscillatory coupling also depends on the ferromagnetic material and interfacial quality.

For this AFC structure 20 the orientations of the magnetic moments 32, 34 of adjacent ferromagnetic layers 22, 24, respectively, are aligned antiparallel and thus add destructively. Because the two ferromagnetic layers in the AFC structure serve different functions with respect to recording, their material properties are substantially different. The upper layer 24 typically has small magnetic grains with almost no intergranular exchange coupling, and has high intrinsic coercivity ($H_0$~8 kOe). These properties for the upper layer 24 are geared toward obtaining the best $S_0NR$. The upper layer 22 is typically a CoPtCrB alloy such as $CO_{68}Pt_{13}Cr_{19}B_{10}$. The lower layer 22 is typically a material with a large amount of intergranular exchange coupling and low intrinsic coercivity ($H_0$~1 kOe). These properties facilitate the PW50 reduction and the material is typically a CoCr alloy, with low Cr content ([Cr]<15 at. %), such as $Co_{89}Cr_{11}$. The material used for the lower layer cannot be used as the upper layer for high performance media. The nonferromagnetic spacer layer 23 is typically ruthenium (Ru).

FIG. 1 is shown for an AFC magnetic layer 20 with a two-layer structure and a single spacer layer. AFC media with more than two ferromagnetic layers and additional AF-coupling spacer layers have been suggested, but no such media have been able to achieve both a reduction in composite Mrt and $S_0NR$.

The Invention

The invention is an AFC media that overcomes the current limitations of AFC media and enables lower Mrt and PW50 to be achieved without compromising $S_0NR$. This structure is shown in FIG. 2 and comprises an AFC layer 120 formed over a conventional underlayer 113 and seed layer 112 on a substrate 111.

Figure 2:
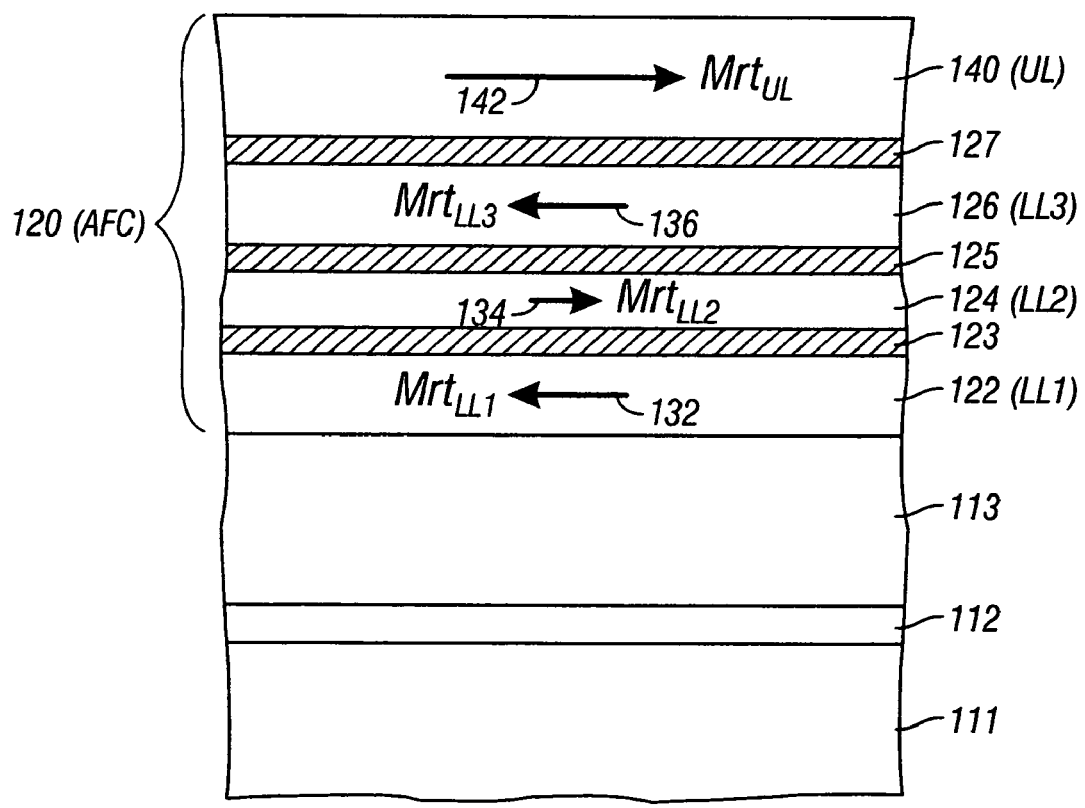
FIG. 2 is a schematic sectional view of an AFC magnetic recording disk according to the present invention.

The AFC layer 120 comprises three lower ferromagnetic layers (LL1, LL2, LL3) (122, 124, 126, respectively, in FIG. 2) and an upper ferromagnetic layer (UL) (140 in FIG. 2). Ferromagnetic layer 140 is called the upper ferromagnetic layer because it is the topmost layer in the AFC structure 120. These four ferromagnetic layers are separated by three antiferromagnetically-coupling layers 123, 125, 127. All four ferromagnetic layers 122, 124, 126, 140 are antiferromagnetically-coupled together. AFC layer 120 has two remanent magnetic states (zero applied magnetic field). The magnetization direction of each layer in one of these states is shown by arrows 132, 134, 136, 142. In the other state, the directions of all the arrows would be reversed.

The UL has an Mrt greater than the Mrt of each of the three lower layers LL1, LL2, LL3 and greater than the sum of the Mrt values of LL1 and LL3. The middle lower layer LL2 has an Mrt less than the Mrt of each of the other lower layers LL1 and LL3. (These relative Mrt values are represented by the relative length of arrows 132, 134, 136, 142). The composite Mrt of the AFC structure 120 is given by:

$$Mrt_{COMPOSITE}=(Mrt_{UL}-Mrt_{LL1})+Mrt_{LL2}-Mrt_{LL3} \quad \text{(Eq. 1)}$$

To compare the recording properties of the AFC media in FIG. 2 with that of the conventional AFC media (FIG. 1), the upper layer UL 140 and first lower ferromagnetic layer LL1 122 can be identical in composition and thickness to the two corresponding layers in the prior art AFC structure of FIG. 1 (layers 22 and 24), so that their corresponding Mrt values are identical. The two intermediate lower ferromagnetic layers LL2 and LL3 can be formed of the same material as the lower layer in the standard AFC structure (layer 22 in FIG. 1), but LL2 will be thinner. LL2 is made to be essentially as thin as possible, provided it remains as a defined magnetic layer (greater than approximately 0.2 nm). Since $Mrt_{LL2}<Mrt_{LL3}$, it can be seen from Eq. 1 above that the composite Mrt of the AFC structure 120 will be less than the composite Mrt of the conventional AFC structure ($Mrt_{UL}-Mrt_{LL1}$). Importantly, this AFC structure is able to achieve this composite Mrt reduction without increasing the Mrt of any of the three lower layers above the maximum Mrt of the single lower layer in the conventional AFC structure and therefore avoids the $S_0NR$ degradation caused by too large of an Mrt in the lower layers. The AFC structure of this invention can be made without the need to change the composition or increase the thickness of any of the three lower layers from the composition and thickness of the single lower layer in the conventional AFC structure. Since all the ferromagnetic layers in AFC structure 120 are antiferromagnetically coupled, and the bottom three ferromagnetic layers LL1, LL2, LL3 are made of thin alloys with a low intrinsic coercivity $H_0$, like the alloys used in the conventional AFC structure, the magnetization pattern recorded into the upper ferromagnetic layer UL will determine the magnetization orientation of the other ferromagnetic layers.

The AFC structure of this invention improves PW50 over the conventional AFC structure without a reduction in $S_0NR$. The media signal-to-noise ratio ($S_0NR$) is the ratio of the isolated signal pulse to noise at a specific recording density (number of flux reversals/linear distance of recorded magnetic transitions). The structures investigated varied only the Mrt of LL2, while keeping the UL thickness constant, and fixing $Mrt_{LL1}=Mrt_{LL3}=0.13$ memu/cm$^2$. These structures were compared with a reference AFC structure with $Mrt_{LL}=0.13$ memu/cm$^2$ (which is approximately the maximum value for $Mrt_{LL}$ above which the $S_0NR$ drops) and with the UL being the same for all structures.

Figure 3:
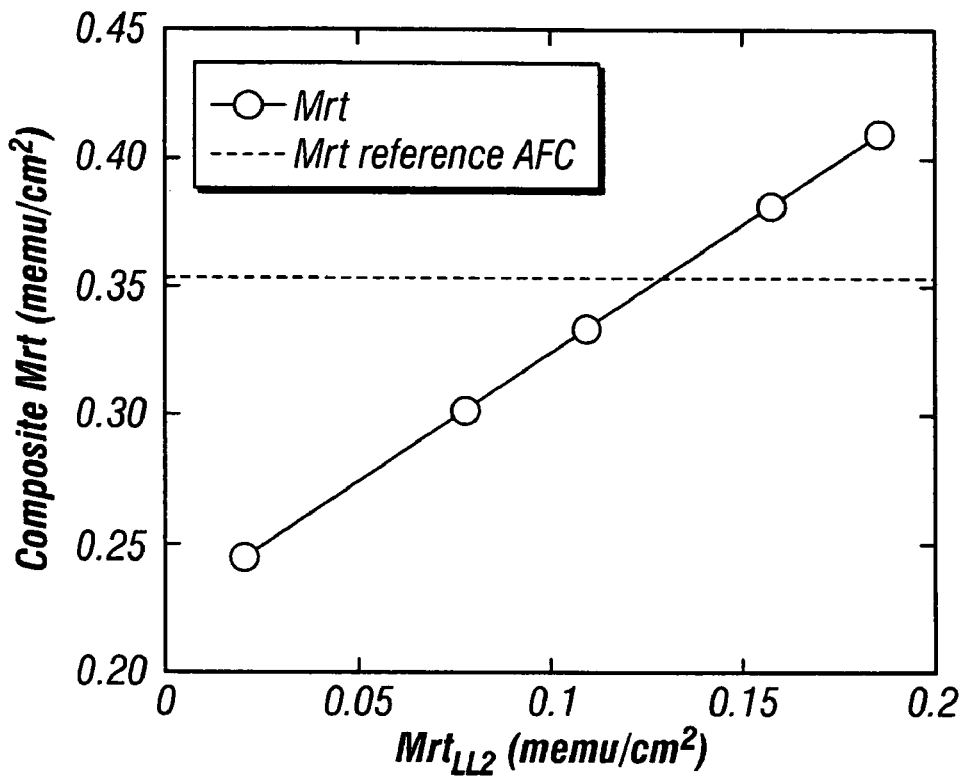
FIG. 3 shows the composite Mrt of the AFC structure of this invention as a function of the Mrt of the middle lower layer.
Figure 4:
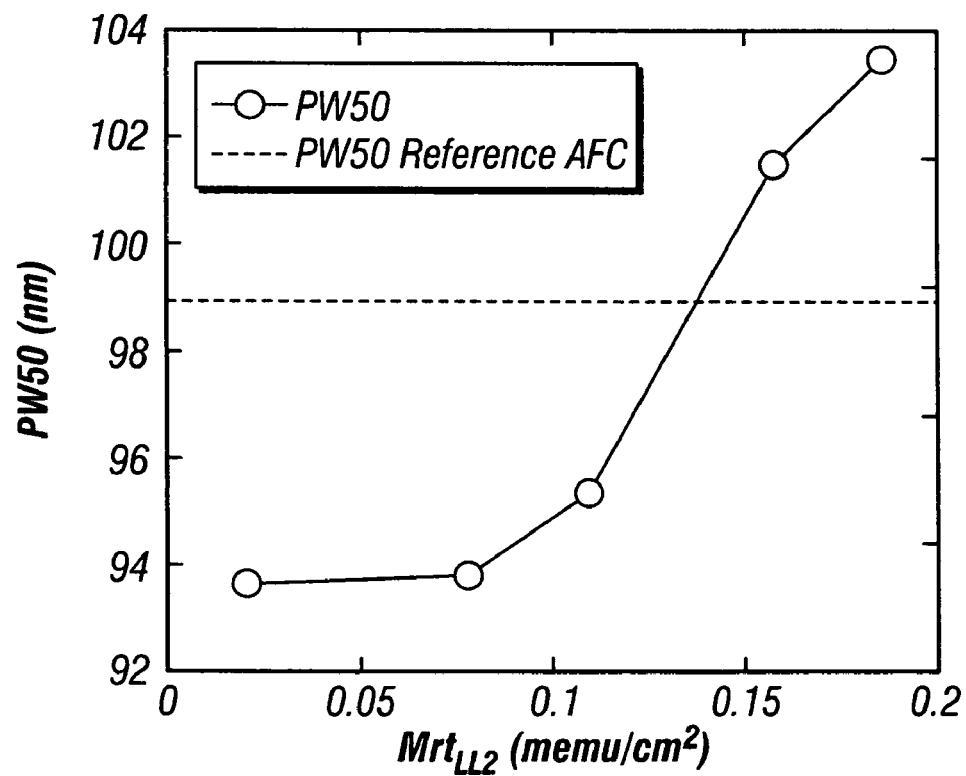
FIG. 4 shows the PW50 of the AFC structure of this invention as a function of the Mrt of the middle lower layer.

FIG. 3 shows the composite Mrt of a series of these structures as function of changing only $Mrt_{LL2}$. The smaller $Mrt_{LL2}$, the smaller the composite Mrt. By reducing $Mrt_{LL2}$ the composite Mrt can be reduced by 0.11 memu/cm$^2$ below the reference AFC structure (0.24 memu/cm$^2$ compared to 0.35 memu/cm$^2$). FIG. 4 shows that as the composite Mrt is lowered, the PW50 is reduced. A reduction of 5% in PW50 was measured.

Figure 5A:
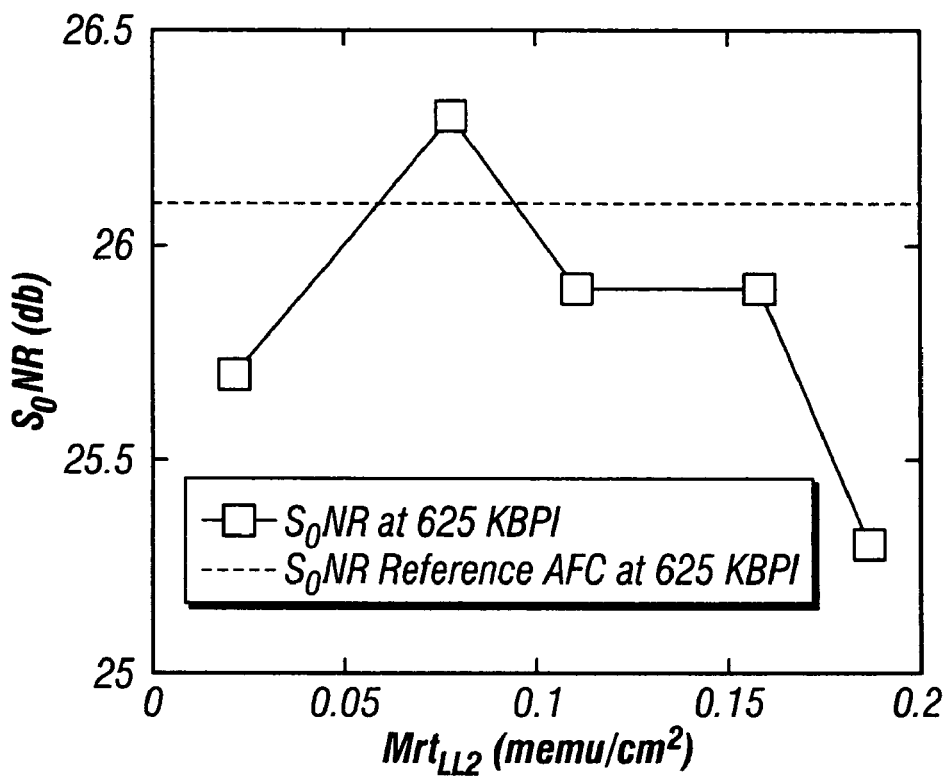
FIGS. 5A–5D show comparisons of the $S_0NR$ of the AFC structure of this invention with the reference AFC structure at four different recording densities.
Figure 5B:
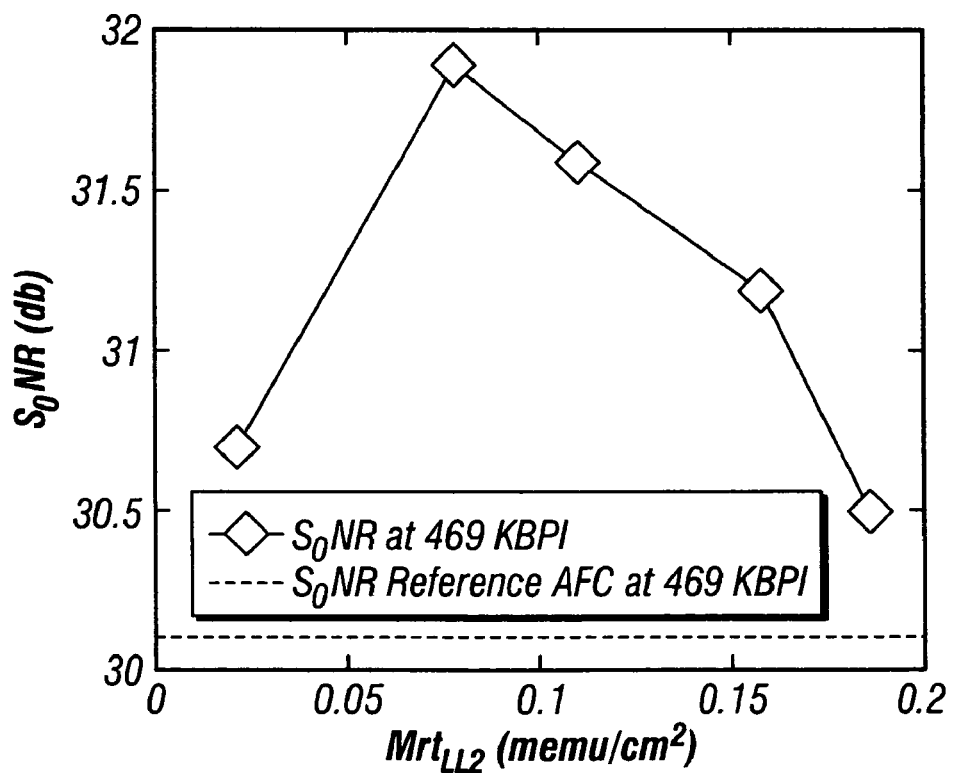
Figure 5C:
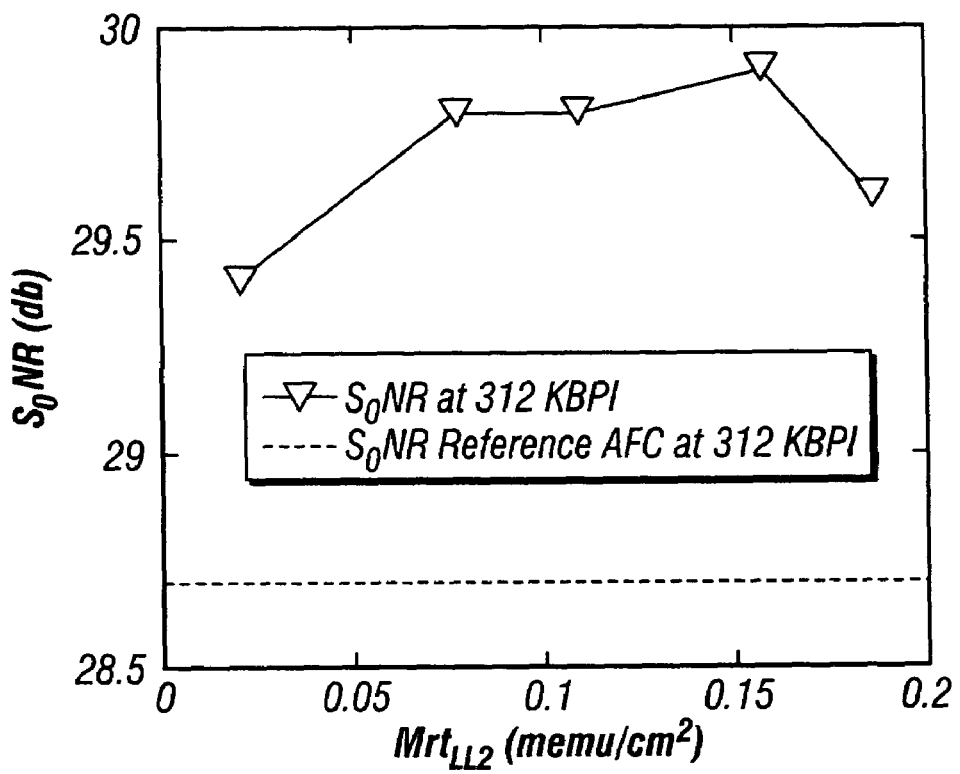
Figure 5D:
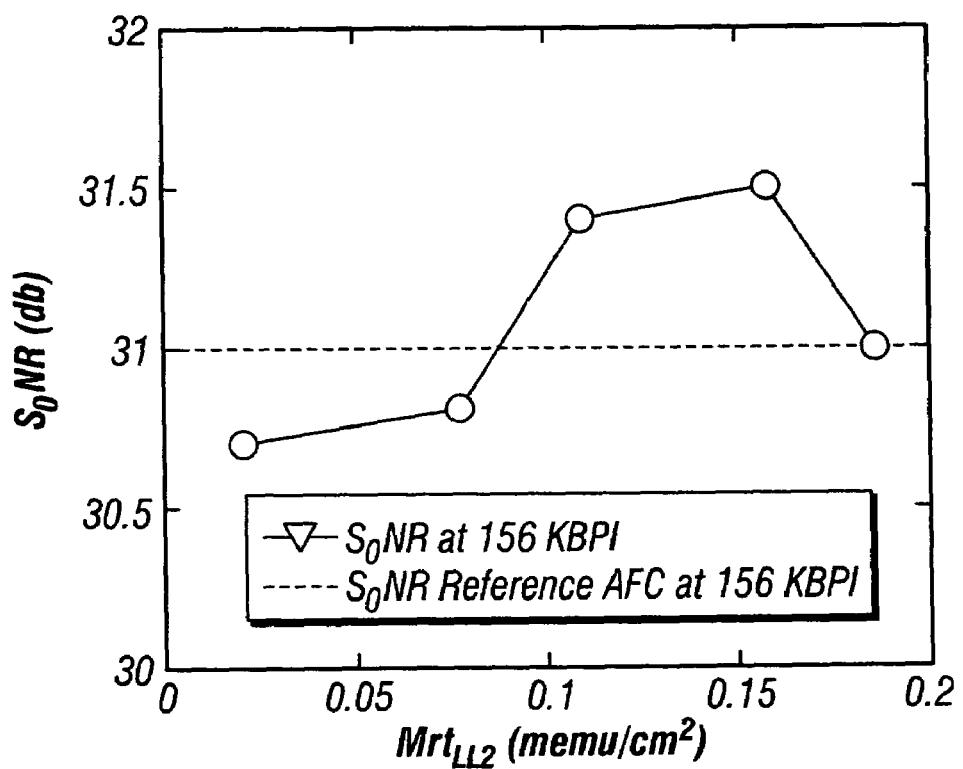

FIGS. 5A–5D compare the $S_0NR$ of the AFC structure of this invention with the reference AFC structure at four different recording densities measured in thousand-bits-per-inch (kbpi). For the layers that measured a reduced PW50 relative to the reference AFC structure, a significant improvement in $S_0NR$ was measured for the important middle recording density regions (FIGS. 5B and 5C). Thus, the AFC structure of this invention achieves a reduction in PW50 for a given UL thickness without compromising $S_0NR$, and overcomes one of the fundamental limitations of conventional AFC media.

The preferred material for the UL is a CoPtCrB alloy with Cr between approximately 16 and 22 atomic percent (at. %), Pt between approximately 12 and 20 at. %, and B between approximately 7 and 20 at. %. Other elements, such as Ta, can be added to this CoCrPtB alloy. The preferred material for each of the lower layers LL1, LL2, LL3 is a CoCr alloy with Cr between approximately 5 and 24 at. %. Other elements can be added to this CoCr alloy, such as B (less than 6 at. %), Ta (less than 5 at. %) and Pt (less than 10 at. %). Ta is especially beneficial to the segregation of the Cr in the CoCr alloy as well as facilitating the epitaxial growth of the subsequently deposited layers. The UL can also be a composite UL of two or more CoPtCrB alloys stacked on top of each other and directly exchange coupled to each other. References herein to the composition range of the UL will mean the average composition of the multiple alloys if the UL is a composite UL.

The AFC structure described above is not limited to the implementation with only three lower layers. For example, the AFC structure may include one or more additional sub-structures. The sub-structure would consist of a pair of lower ferromagnetic layers (e.g., lower layers LL4 and LL5 corresponding to LL2 and LL3, respectively, in FIG. 2) and an antiferromagnetically-coupling layer between LL4 and LL5 (corresponding to layer 125 between LL2 and LL3 in FIG. 2). This substructure would then be located above antiferromagnetically-coupling layer 127 in FIG. 2 and an additional antiferromagnetically-coupling layer would be located between the sub-structure and the upper layer UL. In this example the composite Mrt of the AFC structure would be expressed as:

$$Mrt_{COMPOSITE}=(Mrt_{UL}-Mrt_{LL1})+Mrt_{LL2}-Mrt_{LL3}+Mrt_{LL4}-Mrt_{LL5} \quad \text{(Eq. 2)}$$

The Mrt of the UL in this AFC structure is greater than the sum of the Mrt values of LL1, LL3 and LL5.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk comprising:
   a substrate; and
   an antiferromagnetically-coupled (AFC) magnetic recording layer on the substrate and having two remanent magnetic states in the absence of an applied magnetic field, the AFC recording layer comprising (a) a first lower ferromagnetic layer having a remanent magnetization Mr, a thickness t and a remanent-magnetization-thickness product Mrt; (b) a first antiferromagnetically coupling layer on the first lower ferromagnetic layer; (c) a second lower ferromagnetic layer on the first antiferromagnetically coupling layer and having an Mrt less than the Mrt of the first lower ferromagnetic layer; (d) a second antiferromagnetically coupling layer on the second lower ferromagnetic layer; (e) a third lower ferromagnetic layer on the second antiferromagnetically coupling layer and having an Mrt greater than the Mrt of the second lower ferromagnetic layer; (f) a third antiferromagnetically coupling layer on the third lower ferromagnetic layer; and (g) an upper ferromagnetic layer on the third antiferromagnetically coupling layer and having an Mrt greater than the sum of the Mrt values of the first and third lower ferromagnetic layers;

and wherein the magnetization directions of the upper ferromagnetic layer and the third ferromagnetic layer are substantially antiparallel in each remanent state, the magnetization directions of the second lower ferromagnetic layer and the first ferromagnetic layer are substantially antiparallel in each remanent state, and the magnetization direction of the upper ferromagnetic layer in one remanent state is substantially antiparallel to its magnetization direction in the other remanent state.

2. The disk of claim 1 wherein the lower ferromagnetic layers are formed of substantially the same material, and wherein the second ferromagnetic layer has a thickness less than the thickness of each of the first and third lower ferromagnetic layers.

3. The disk of claim 1 wherein the upper ferromagnetic layer is an alloy comprising Co, Pt, Cr and B, and wherein each of the lower ferromagnetic layers is an alloy comprising Co and Cr.

4. The disk of claim 3 wherein each of the lower ferromagnetic layers is an alloy further comprising Ta.

5. The disk of claim 1 wherein each of the antiferromagnetically coupling layers a material selected from the group consisting of ruthenium (Ru), chromium (Cr), rhodium (Rh), iridium (Ir), copper (Cu), and their alloys.

6. The disk of claim 1 further comprising an underlayer located on the substrate between the substrate and the AFC recording layer.

7. The disk of claim 1 further comprising a protective overcoat formed over the upper ferromagnetic layer.

* * * * *